United States Patent [19]

Zimmerman et al.

[11] Patent Number: 4,562,235

[45] Date of Patent: Dec. 31, 1985

[54] HYDROXYL-TERMINATED POLYMERS

[75] Inventors: John M. Zimmerman, Des Plaines; John J. Krajewski, Wheeling; Gerry K. Noren, Hoffman Estates, all of Ill.

[73] Assignee: DeSoto, Inc., Des Plaines, Ill.

[21] Appl. No.: 601,439

[22] Filed: Apr. 18, 1984

[51] Int. Cl.$^4$ ............................................. C08F 20/18
[52] U.S. Cl. ................................... 526/304; 428/463; 524/507; 524/509; 524/512; 526/320; 526/329.7
[58] Field of Search ...................... 526/304, 328, 329.7, 526/320; 560/205

[56] References Cited

U.S. PATENT DOCUMENTS

| | | | |
|---|---|---|---|
| 3,047,544 | 7/1962 | Byrd | 528/390 |
| 3,838,140 | 9/1974 | Mayer-Mader | 528/390 |
| 4,156,764 | 5/1979 | White | 526/222 |

FOREIGN PATENT DOCUMENTS 11990 2/1978 Japan ................................... 525/343

Primary Examiner—Christopher A. Henderson
Attorney, Agent, or Firm—Dressler, Goldsmith, Shore, Sutker & Milnamow, Ltd.

[57] ABSTRACT

There is disclosed linear polymers and copolymers of polymerized monoethylenically unsaturated monomers having a weight average molecular weight from about 1,500 to about 15,000, with most of the polymer ends being terminated with hydroxyl groups, one at each end of the polymer molecule. These polymers have an average of from about 1.6 to 5 hydroxyl groups per polymer molecule. Thermosetting coating compositions containing these polymers are also disclosed. The monomers which are polymerized may include a small proportion of hydroxy-functional monomers, but desirably consist of monoethylenically unsaturated monomers lacking hydroxyl functionality. The polymers are produced by polymerizing the monoethylenically unsaturated monomers in organic solvent solution medium containing a free radical initiator and a proportion of a chain-terminating agent which is a bis hydroxyorganic xanthogen disulfide in which the organic group is preferably an alkylene group contains from 2–18 carbon atoms to provide the desired molecular weight. The polymers are preferably liquid to slowly flowable at room temperature in the absence of organic solvent.

13 Claims, No Drawings

HYDROXYL-TERMINATED POLYMERS

DESCRIPTION

1. Technical Field

This invention relates to the production of low molecular weight hydroxyl terminated polymers and copolymers by the solution copolymerization of monoethylenically unsaturated monomers. Polymers which are liquid to slowly flowable in the absence of inert volatile organic solvent are particularly contemplated. These liquid polymers are particularly adapted for the production of coating compositions which cure to form solid coatings on various substrates and which contain very little organic solvent.

2. Background Art

Coating compositions which cure by various mechanisms are known, but these have to be liquid in order to be applied. The traditional way to handle this problem is to dissolve the polymer in organic solvent solution, but the solvents add to the cost, they are flammable and they also introduce pollution problems when the solvents evaporate after application. Accordingly, a considerable effort has been made in recent years to minimize the proportion of organic solvent which is present. It is desirable to not only minimize the solvent content of the coating composition, but to eliminate it completely. This is rarely possible.

It has also been desired to use acrylate or methacrylate-containing polymers because these are of only moderate cost and provide good properties, but the acrylate and methacrylate-containing polymers produced by solution polymerization are generally solid materials in the absence of solvent, and significant proportions of organic solvent are needed to provide the liquidity needed for coating application.

It has also been desired to provide polymers containing hydroxyl functionality to enable the desired film properties to be provided by some cure subsequent to application. However, it has not been possible to limit the number of hydroxyl groups to only two positioned at the ends of the polymer so as to enable the provision of cured polymers having a regular structure. As is well known, if a small proportion of some reactive monomer is included among the monomers being copolymerized, there is no way to insure that any given polymer molecule will contain any given number of reactive groups because some molecules will contain more than others. This is particular disadvantageous when the reactive functionality is low.

DISCLOSURE OF INVENTION

In accordance with this invention, we have found that linear polymers and copolymers of polymerized monoethylenically unsaturated monomers can be provided which are unusual in one or both of two different ways. First, they can be formed in whatever molecular weight is desired, and this includes low molecular weight in which the polymers are liquid to slowly flowable in the absence of solvent at room temperature (25° C.). Second, these polymers carry two terminally positioned hydroxyl groups (one at each end of the linear polymer molecule). This is achieved by carrying out the polymerization in organic solvent medium containing, in addition to the conventional initiator, a proportion of a chain-terminating agent of special character, namely: a bis hydroxyorganic xanthogen disulfide, such as bis (4-hydroxybutylxanthogen) disulfide. In these disulfides, the organic group is preferably an alkylene group containing from 2-18 carbon atoms, preferably from 3-6 carbon atoms, such as ethylene, propylene, or butylene groups.

Accordingly, this invention provides a linear polymer of polymerized monoethylenically unsaturated monomers having a weight average molecular weight from about 1,500 to about 15,000 and most of the polymer ends are terminated with hydroxyl groups, one at each end of the polymer molecule. Small proportions of hydroxy-functional monomers may be present in the monomers which are polymerized, so polymers having an average of from about 1.6 to 5 hydroxyl groups per polymer molecule are particularly contemplated. An average hydroxyl functionality not in excess of 2.2 is preferred since this provides polymers with greater flexibility and which are less brittle and exhibit reduced shrinkage on curing. When hydroxy-functional monomers are present in amounts up to about 10% by weight of total monomers, the increased hydroxy functionality can be used to increase the cross-link density, and hence the hardness and solvent resistance, of the cured polymer.

As a matter of ease of presentation, the term "polymer" is sometimes used herein where both polymers and copolymers are intended, and the term "solvent" is sometimes used where inert volatile organic solvent is intended.

The polymers are preferably liquid to slowly flowable in the absence of organic solvent at room temperature. When the polymer contains essentially only two terminally positioned hydroxyl groups per molecule, it provides advantage even when the molecular weight is above 15,000 because it minimizes the presence of loose ends in the cured polymer. A weight average molecular weight in the range of 2,000 to 12,000 is preferred, more preferably from 3,000 to 10,000. These low molecular weights are obtained at high yield of monomer to polymer, usually 90% or better. As a matter of interest, when the solvent is removed at the end of the polymerization reaction, unreacted monomer is normally removed with the solvent, so the unreacted monomer content of the polymeric product is usually below 1%.

To describe the method of this invention in greater detail, the polymers of this invention are produced by polymerizing monoethylenically unsaturated monomers in organic solvent solution medium containing a conventional free radical initiator, such as a peroxide, like benzoyl peroxide, of a diazo compound like azo bis isobutyronitrile, and a proportion of a chain-terminating agent which is a bis hydroxyorganic xanthogen disulfide in which the hydroxy group is the sole reactive group carried by the organic group. The preferred organic group is the alkylene group which has been defined and illustrated hereinbefore. The proportion of disulfide is determined by the molecular weight which is desired, as will be explained.

The coating compositions which are contemplated in this invention will contain the hydroxyl-terminated polymers described above, and the polymer will either contain a reactive group which can react with the hydroxyl group under appropriate baking conditions, or a curing agent reactive with the hydroxyl group, such as an aminoplast, phenoplast or organic polyisocyanate curing agent, and whatever organic solvent proportion is needed to provide an appropriate coating viscosity. When low molecular weight liquid polymers are formed in this invention, very little solvent is needed, and this allows the formation of high solids coating compositions.

The polymer may contain a reactive group for cure, and when there is an external curing agent, this may be the hydroxy group, as may be provided by having a proportion of hydroxyalkyl acrylate or methacrylate in which the alkyl group contains from 2–4 carbon atoms, such as 2-hydroxyethyl acrylate or methacrylate, present during the copolymerization. It is preferred to provide the internally reactive group using an N-methylol functional monomer, like N-methylol acrylamide or N-methylol methacrylamide. These provide a vigorous curing reaction with the hydroxyl group. These N-methylol functional monomers are preferably used in the form of an ether with a volatile alcohol, typically butanol or 2-ethoxy ethanol. If desired, the etherification can be carried out after copolymerization.

The aminoplast and phenoplast curing agents which may be used are themselves well known and are illustrated herein by hexamethoxymethyl melamine and A stage resols. These require baking temperatures of from 250° F. to about 500° F. Organic polyisocyanates will induce a cure at room temperature, but such systems must be used rapidly after the coating mixture is formed. When the polyisocyanate is blocked, as with an alcohol like 2-ethyl hexanol, then the baking conditions noted previously will remove the blocking agent and induce a rapid cure.

In the coating compositions of this invention, the proportion of the solvent may be further reduced by using a small amount of a liquid polyhydric alcohol having a molecular weight above about 300, preferably above 400, so as to be nonvolatile during the elevated temperature bake used to induce the desired cure. The polyhdric alcohol reduces viscosity and participates in the desired cure.

Referring more particularly to the optional polyhydric alcohol, this component is subject to wide variation so long as basic substituents and contaminants are absent. Polyhydric alcohols which are polyethers, such as $C_2$–$C_4$ alkylene oxide adducts of polyhydric alcohols, such as ethylene glycol, butylene glycol, glycerin, trimethylol propane and the like are all useful. Pluracol TP 440 and P 1010 supplied by Wyandotte, polypropylene glycol 425, and Dow products 565 and 8025, all of which are known compositions, can be used herein to supplement the hydroxyl groups provided by the hydroxyl-terminated polymer or copolymer. These conventional polyhydric alcohols are useful in providing desired fluidity in the coating composition by the use of something which cures to become an integral part of the final film. This minimizes the proportion of inert volatile organic solvent which is needed in the coating composition.

The hydroxyl-terminated polymers and copolymers of this invention are solution polymers made by polymerizing one or more monoethylenically unsaturated monomers in solvent solution to provide a solvent-soluble polymer, the solution including the specified chain-terminating agent. These agents preferably have the following structure:

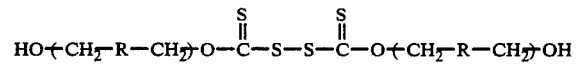

where R is an organic radical free of reactive groups (preferably a hydrocarbon group and most preferably an alkylene group) containing from 0 to 16 carbon atoms, preferably 2 carbon atoms to provide a butylene group, and the OH group is preferably a primary OH group. Suitable groups are the ethylene group, the butylene group, the hexylene group, the dimethyl benzyl group, the dibutyl ether group, and the like. Any organic compound free of reactive groups other than the two alcoholic hydroxy groups or the anhydride of these two hydroxy groups can be incorporated into the xanthogen compound in the same known way as butylene glycol provides the compound which is used as illustrative herein.

The polymers which are formed have the following structure:

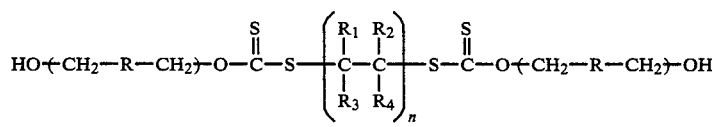

where R is the same as indicated previously, and $R_1$, $R_2$, $R_3$ and $R_4$ are the remaining groups in the monoethylenic monomers which were polymerized, or hydrogen, and n is the number of repeating units in the polymer, desirably providing a molecular weight in the range of 1,500 to 15,000. Polymers which are liquid to slowly flowable in the absence of organic solvent at room temperature are especially preferred.

It will be understood that the conventional initiator will initiate some polymer growth as well as function to convert the chain terminators used herein into free radicals which are effective to both initiate and terminate polymer growth, though most of the termination is by chain transfer with the disulfide. As a result, and while most of the polymer molecules will be hydroxy terminated at both ends, some of these molecules will be hydroxy terminated at only one end, and some molecules may terminate conventionally and not have hydroxy terminal groups. To minimize the presence of polymer molecules with no hydroxy groups or with only one hydroxy group, it is permissible to include a small proportion of hydroxy monomer in the monomers which are copolymerized, as previously pointed. The possibility of chain termination which does not introduce a terminal hydroxy group makes it possible to produce polymers with as little as about 1.6 hydroxyl groups per molecule, and the presence of hydroxy monomer can lead to hydroxy functionalities as high as 5 which stills allows some of the advantages of this invention to be obtained.

A large number of monoethylenic monomers may be used alone or in any desired combination, though it is preferred that at least 30%, preferably at least 50% of the copolymer is an acrylate or methacrylate ester with an alkanol containing from 1–18 carbon atoms. As previously indicated, it is desirable to avoid monomers which bring in the hydroxyl group, because the presence of an hydroxyl-functional monomer provides other sources of reactive functionality which creates uncertainty in the number of reactive groups present in each molecule and which induces branching when more than two such groups are present. Nonetheless, the polymerization of this invention is still useful because it provides a more uniform molecular weight product or a lower molecular weight product which is not otherwise obtainable.

Since important advantage is obtained when the polymer contains only two hydroxy groups per molecule, the monomers which are polymerized preferably consist of monethylenically unsaturated monomers which do not possess hydroxyl functionality.

Typical monomers which can be used are styrene, vinyl toluene, vinyl acetate, acrylamide, esters of monoethylenic acids, like methyl, ethyl, propyl or butyl acrylate or methacrylate, acrylonitrile, vinyl butyl ether, ethylene, and the like. It is preferred to employ monomers in which the single ethylenic group is the sole reactive group so as to provide a polymer which is devoid of reactive functionality other than that provided by the chain terminating agent. This is preferred because it allows the production of cured polymers in which molecular weight is provided by cure with a minimum of rigidifying cross-links. This produces coatings which are very flexible and impact resistant. On the other hand, if reactive groups other than the two provided by the chain-terminating agent are used, then the properties obtained by cure are more conventional, but they are obtained using a polymer which is liquid and which requires less volatile organic solvent than was previously needed.

Halogen-containing monomers may also be present, these being illustrated herein by vinyl chloride, vinylidene chloride and vinylidene bromide. Copolymers of these with acrylate esters, like methyl acrylate or isobutyl methacrylate, are particularly preferred, as will be illustrated hereinafter.

Methyl methacrylate normally forms high molecular weight brittle polymers requiring large amounts of organic solvent for coating purposes, but it can be used in this invention with very little organic solvent.

The proportion of the chain terminating agent which may be used herein may vary widely, but the desired low molecular weight is obtained using an amount of up to about 20%, preferably from 2.0% to 15%, based on the weight of the monomers being polymerized or copolymerized. Proportions are important because the proportion of the chain terminator determines the molecular weight which is produced. The more chain terminator, the lower the molecular weight. One molecule of chain terminator for every 15000 units of monomer molecular weight will yield a weight average molecular weight of 15000 plus the weight of the chain terminator (which is comparatively small). The proportion of chain terminator is thus defined by the molecular weight which is desired when this factor is specified.

The hydroxyl group of the chain terminating agent is preferably a primary hydroxyl group to minimize its reactivity with acrylate or methacrylate unsaturation in the growing polymer chain. Of course, when such unsaturation is not present, the primary nature of the hydroxyl group is no longer important.

Throughout this application, and in the examples and claims which follow, all parts and proportions are by weight, unless otherwise stated.

EXAMPLE 1 (synthesis of bis (4-hydroxybutylxanthogen)disulfide)

1338.2 grams of 1,4-butanediol (14.849 moles) and 143.0 grams of carbon disulfide (1.878 moles) were poured into a 5 liter 4-necked round bottom flask fitted with a stirrer, a dropping funnel, and a thermometer. The flask was immersed in ice water to cool its contents to 17° C. and 260 ml. of an aqueous solution containing 75.7 grams of sodium hydroxide (1.893 moles) were added through the dropping funnel over a period of 1 hour. The mixture in the flask was stirred at room temperature for 3 hours. 400 ml. of water were then added and then 550 ml. of an aqueous solution containing 242.7 grams of ammonium persulfate were added dropwise over a 1 hour period. The product was then diluted with 800 ml. of water and then extracted with 1500 ml. of methylene chloride. This dilution with water followed by extraction with methylene chloride was carried out twice and the product was then contacted with magnesium sulfate to remove any water present. The methylene chloride was then removed by vaporizing it at 30° C. under vacuum. 312.6 grams of liquid product having a yellow color and a slight sulfur odor were obtained. This represents a yield of 100.7% of the theoretical yield. Further washing can further eliminate contaminants, and thus lower the yield slightly, but this is not needed for a practical and useful product.

EXAMPLE 2 (production of low molecular weight polymer)

A 3 liter 4-necked flash was set up with a stirrer, a thermocouple probe, a cold water condenser, and a nitrogen blanket and placed in a water bath maintained at 60° C. 11.4 grams of the commercial free radical generating catalyst (Vazo 52) were added to the flask in 507.3 grams of methyl ethyl ketone. After 5 minutes to warm the flask contents, a separately prepared liquid mixture of 677.8 grams of methyl acrylate and 62.0 grams of the bis (4-hydroxybutylxanthogen)disulfide of Example 1 were slowly added to the flask over a 3 hour period. The temperature in the flask increased as the monomer reacted, and when the temperature finally subsided back to the temperature which existed before monomer addition, it was concluded that polymerization was complete. The solvent was then removed at 60° C. using a vacuum which reached 30 mm Hg. The product was a liquid polymer having a viscosity of 200,000 centipoises at 25° C. having a faint yellow color and a slight acrylate odor. While the viscosity is high, methyl acrylate has a relatively high glass transition temperature and normally produces solution polymers which are hard solids after removal of the solvents in which they are produced.

EXAMPLE 3

The liquid hydroxy-functional polymer of Example 2 is combined with 15% of its weight of hexamethoxymethyl melamine and sufficient methyl ethyl ketone is provide coating viscosity. This composition is drawn down upon a steel substrate to provide a layer 0.5 mil thick which is cured by baking for 20 minutes in a 350° F. oven. The cured product is a hard and abrasion-resistant film.

EXAMPLE 4

Example 2 is repeated except 65 parts of isobutoxymethyl acrylamide are added to the methyl acrylate monomer. The polymer is again a liquid of high viscosity, and it provides a curable coating when reduced to coating viscosity with methyl ethyl ketone solvent. The coating hardens when coated and baked as in Example 3 without the addition of hexamethoxy methyl melamine.

EXAMPLE 5

Example 4 is repeated except 5% of a polyol (a polyoxypropylene derivative of trimethylol propane having a molecular weight of about 440) is added to the polymer prior to reduction with methyl ethyl ketone. Less solvent is needed and the coating still hardens to form a useful film when baked.

EXAMPLE 6

Example 3 is repeated except the hexamethoxymethyl melamine is replaced with an equal weight proportion of octanol-blocked isophorone diisocyanate. The cure can now be carried out at 300° F.

EXAMPLE 7

Example 3 is repeated except that 5% by weight of 2-hydroxyethyl acrylate is included with the methyl acrylate monomer in Example 2. The cured product was harder and more solvent resistant than that obtained in Example 3.

What is claimed is:

1. A linear polymer or copolymer consisting essentially of polymerized monoethylenically unsaturated monomers including at least 30% of acrylate or methacrylate monomers and having a weight average molecular weight from about 1,500 to about 15,000, most of the polymer ends of said polymer being terminated with hydroxyl groups, one at each end of the polymer molecule, said hydroxyl groups being provided by a chain-terminating agent which is a bis hydroxyorganic xanthogen disulfide, said polymer having an average of from about 1.6 to 5 hydroxyl groups per polymer molecule.

2. A linear polymer as recited in claim 1 in which the hydroxyl functionality of the polymer is not in excess of 2.2.

3. A linear polymer as recited in claim 1 in which said monomers include hydroxy-functional monomer in an amount up to about 10% by weight of total monomers.

4. A linear polymer as recited in claim 1 in which said polymer is liquid to slowly flowable in the absence of solvent at room temperature.

5. A linear polymer as recited in claim 1 in which said monomers which are polymerized consist essentially of monoethylenically unsaturated monomers lacking hydroxyl functionality.

6. A linear polymer as recited in claim 1 in which the organic group is an alkylene group contains from 2–18 carbon atoms.

7. A linear polymer as recited in claim 6 in which said alkylene group contains from 3–6 carbon atoms and said hydroxy groups are primary hydroxy groups.

8. A linear polymer as recited in claim 1 in which said monomers include an N-methylol functional monomer.

9. A linear polymer as recited in claim 8 in which said N-methylol functional monomer is present in the form of an ether with a volatile alcohol.

10. A linear polymer or copolymer of monoethylenically unsaturated monomers having the formula:

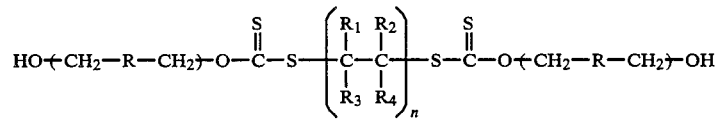

where R is an organic radical free of reactive groups containing from 0 to 16 carbon atoms, the OH group is a primary OH group, and $R_1$, $R_2$, $R_3$ and $R_4$ are the remaining groups in the monoethylenic monomers which were polymerized, or hydrogen, and n is the number of repeating units in the polymer providing a molecular weight in the range of 1,500 to 15,000.

11. A linear polymer as recited in claim 10 in which said polymer is liquid to slowly flowable in the absence of solvent at room temperature.

12. A polymer as recited in claim 10 in which R is a hydrocarbon group.

13. A polymer as recited in claim 10 in which said hydrocarbon group is an alkylene group.

* * * * *